3,294,866
NON-HEAT-REACTIVE, HIGHER-ALKYLPHENOL RESINS AS RUBBER TACKIFIERS
Anthony C. Soldatos, Kendall Park, N.J., assignor to Union Carbide Corporation, a corporation of New York
No Drawing. Filed Apr. 18, 1963, Ser. No. 273,816
13 Claims. (Cl. 260—845)

This application is a continuation-in-part of copending application Serial No. 231,041, filed October 16, 1962, now abandoned.

The present invention relates to alkylphenol resins as rubber tackifiers. More particularly, the present invention relates to the use of acid-catalyzed, fusible, non-heat-reactive, alkylphenol-formaldehyde novolak resins as rubber tackifiers, wherein said phenolic alkyl group contains from 9 to 15 carbon atoms, for improving the "building tack" of rubber and to rubber compositions containing them.

"Building tack" is the surface property of natural rubber which enables two pieces of unvulcanized stock to adhere together when brought in contact under moderate pressure. This phenomenon is specific between two pieces of natural rubber. Such stock will not adhere to other substances such as metal glass or wood.

This attribute is important not only for rubber stock used in the manufacture of tires but of rubber used in tapes, calking compounds and the like. Uncured compositions of natural rubber, such as are used in the manufacture of tires, patches, tapes and the like, are inherently tacky. When two surfaces of natural rubber are pressed together, the two surfaces adhere. This permits assembly of rubber parts in an uncured state which can withstand rough treatment in handling. This property also permits natural rubber to be used as electrical tapes, and tire patches, and other such uses wherein a high degree of auto-adhesion is a pre-requisite. Sheets of natural rubber have been laminated together to attain a thick sheet of desired dimensions which can be used as molding stock; its inherent tack permits contact lamination. This procedure facilitates immediate preparation of molding stock of various thicknesses.

Synthetic rubbers unfortunately do not have this tack and as a result their use is somewhat limited in comparison to natural rubbers. Various expedients have been used to impart tack to synthetic rubbers so that they might be used in instances where tack is a required or desired property and thus enable them to better compete with natural rubber.

The most successful of these expedients has been to incorporate into the synthetic resin composition various polymeric resin compositions which possess tack and which can impart this property to the synthetic rubber in admixture.

It has been known heretofore to impart improved tack to rubbers by incorporating therein additive tackifiers such as rosin, polyterpenes, coumarone-indene resins and the like. It is also known that certain novolak resins can be used. However, the degree of tack which these agents impart to rubbers is low and therefore large amounts must be used, thereby increasing the cost of the product and affecting the desirable properties of the rubber.

In accordance with the present invention it has been found that unobvious and unexpected results can be obtained in synthetic rubber stock compositions by using certain p-alkylphenol-formaldehyde novolak resins. It is most critical in this invention that the novolak resins be made from a p-alkylphenol wherein the said p-alkyl group contains from 9 to 15 carbon atoms inclusive and is a mixture of isomeric alkylphenols as hereinafter described. The use of such non-heat-reactive phenol-formaldehyde acid catalyzed novolak resins in synthetic rubber compositions as tackifiers, increases the tack produced up to 80% over that produced by other phenol-formaldehyde resin used heretofore, depending to a degree on the synthetic rubber used. It has also been found that the tackifiers of the present invention have a lower inhibiting effect on vulcanization than do the tackifiers of the prior art. The inhibition effect of the prior art tackifiers restricts their use considerably.

The non-heat-reactive phenol-formaldehyde resins used in the present invention are those produced through the acid catalyzed reaction of formaldehyde and an isomeric p-alkylphenol having the structural formula:

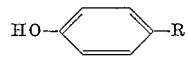

wherein R is an alkyl group containing from 9 to 15 carbon atoms, inclusive. Illustrative of such alkyl groups are isomeric nonyl groups, isomeric decyl groups, isomeric undecyl groups, isomeric dodecyl groups, isomeric tridecyl groups, isomeric tetradecyl groups, isomeric pentadecyl groups and the like. By the terms "alkyl group" and "mixtures" as employed herein is meant those mixtures composed predominantly of branched chain p-alkyl groups and which contain less than 50 percent of any one straight chain alkyl groups. Isomeric alkylphenols wherein R contains from 9 to 12 carbon atoms, inclusive, produce the phenol-formaldehyde resins which are outstanding in their ability to impart increased tack to synthetic rubbers and which are easily prepared and are for these reasons, preferred. Quite surprisingly, the equivalent resins prepared from alkylphenols having 8 or less carbon atoms in the alkyl group are quite demonstrably inferior.

The alkylphenols which are useful in preparation of the phenol-formaldehyde resins of the present invention can be prepared by condensing isomeric olefins containing from 9 to 15 carbon atoms and having one remaining unsaturated bond with phenol by conventional condensation reactions. Separation of the ortho-isomer, if desired, can be accomplished by distillation or other convenient means. However, small amounts of the ortho-isomer can be tolerated in all rubbers. The sulfur-vulcanizable ethylene-propylene-diene copolymer rubbers, prepared by copolymerizing ethylene, propylene, and a diene hydrocarbon usually an unconjugated diolefin, can tolerate as much as 40 percent ortho isomer. For this reason and for the reason that isolation of the isomer is avoided, it is preferred to use ortho-para-isomeric mixtures in these rubbers.

By way of illustration, isomeric propylene trimer (i.e. nonylene) containing one unsaturated bond is such a mixture of isomers having nine carbon atoms. It can be reacted with phenol to yield a mixture of ortho and para substituted nonylphenols, the para isomer being present in a major amount. The product is thus principally a mixture of isomeric p-nonylphenols. By the same method isomeric p-decylphenol can be produced by copolymerizing propylene with butylene and fractionating the decyl isomers before reacting with phenol; isomeric p-undecyl phenol can be prepared in the same manner but by varying the ratio of the olefins. Isomeric p-dodecylphenol is prepared as the tetramer of propylene which is then condensed with phenol, and so forth. Other methods of preparation such as cracking higher molecular weight hydrocarbon and the like can also be used and are well known in the art.

Straight chain alkyl groups on the alkylphenol do not, however, provide the results secured by the isomeric mixtures employed herein. In fact, these straight chain groups provide no better results than do the lower alkyl phenol novolaks whereas those of this invention generally produce from 20 to 80 percent greater tack with synthetic elastomers. Far superior results are obtained by preparing the novolac resins from isomeric mixtures of a particular p-alkylphenol than are obtained from any one p-alkylphenol isomer used alone in the preparation of the novolac resins.

The alkylphenol-formaldehyde novolac resins used in the present invention are prepared in the known manner of making novolac resins such as is disclosed by T. S. Carswell's text "Phenoplasts; Their Structure Properties, and Chemical Technology" (Interscience Publishers, New York) which is herewith incorporated by reference. This preparation can be accomplished by reacting at least 0.7 mole of formaldehyde per mole of alkyl phenol in the presence of an acidic catalyst. It is preferred however to react from 0.9 to 1.5 moles of formaldehyde per mole of phenol as these ratios of reactant produce resins which generally do not tend to sinter after long periods of storage. The formaldehyde reactant can be used in aqueous solution such as formalin (37% or as paraform, i.e. the formaldehyde-yielding polymer of formaldehyde).

The alkylphenol and the formaldehyde reactant are generally condensed by reacting them at a temperature of from about 20° to about 150° C. in the presence of a catalytic amount of acid catalyst.

The term "rubbers" as used herein includes not only the many various grades of natural rubbers but also material known as the synthetic rubbers which are similar to unvulcanized natural rubber in most of its properties, particularly in its degree of elastic recovery or elasticity and its elongation at break. Natural rubbers include of course all grades commercially available as well as all forms such as smoked sheet, pale crepe, and the like. The synthetic rubbers can be homopolymers or copolymers of two or more monomers which yield a polymer having rubbery characteristics. Many of these rubbers are of the butadiene type, i.e. polybutadiene, butadiene-styrene copolymers, butadiene-acrylonitrile copolymers, butadiene-styrene-acrylonitrile terpolymers, polyisoprene, polychloroprene and the like rubbers, isobutylene homopolymers and copolymers, such as butyl rubber i.e. polyisobutylene and the like, as well as the rubbery ethylene-propylene copolymeric materials such as ethylene-propylene rubbers, the ethylene-propylene-diene copolymer rubbers and the like, halogenated olefin polymers such as chlorinated polyethylene and chlorinated polypropylene, the polypropylene oxide rubbers, and the like.

All the above rubbers are well known. The ethylene-propylene-diene copolymer rubbers are however, relatively new. Similar in composition and properties to the ethylene-propylene rubbers, these rubbers possess sufficient "residual diene" unsaturation to permit sulfur vulcanization, a highly desirable property. These are made in a manner similar to the ethylene-propylene copolymer rubbers except that from about one to about twenty percent of a diolefin or diene, usually unconjugated, is interpolymerized with the ethylene-propylene monomer mixture. Illustrative methods of producing these types of rubbers can be found in U.S. Patent 2,933,480 issued April 19, 1960 and British Patent 880,904 published October 25, 1961.

It should be noted that while both natural rubber and polyisoprene generally have sufficient inherent tack for many applications so that tackifying agents are not necessary, tack of these materials is increased by use of the tackifying agents of the present invention.

Natural and reclaimed rubber are generally added to standard rubber stock compositions to produce a stock of smooth uniform consistency. Blends of various rubbers can of course be used in this invention, particularly desirable of which are blends of natural and synthetic rubbers. In the examples which follow, natural and reclaimed rubber have been added to some of the stock compositions in order to reproduce as closely as possible, industrial formulations.

The amount of tackifying agent used in a rubber composition is largely dependent upon the use to which the rubber is to be put but should increase the tack of the rubber employed. For example, when the tackified rubbers are to be used directly as solid stock material in the manufacture of tires and generally mechanical goods, alkylphenol-formaldehyde resins of the present invention are generally used in amounts of from two parts to twenty parts by weight per hundred parts by weight of rubber and preferably from three parts by weight to twelve parts by weight per hundred parts by weight of rubber. When the tackified rubber is to be used as insulating tapes and similar uses where a high degree of auto-adhesion is necessary, alkylphenol-formaldehyde resins of the present invention are generally used in an amount of from ten to one-hundred parts by weight per hundred parts by weight rubber, and preferably of from thirty to sixty parts by weight alkylphenol-formaldehyde resin per one-hundred parts by weight rubber. For all practical end uses, the alkylphenol-formaldehyde resins of the present invention can be used in an amount of from two parts by weight to one-hundred parts by weight per hundred parts by weight rubber.

The alkylphenol-formaldehyde resin can be conveniently admixed with the rubber by any of the conventional blending means known to the art. Illustrative of such blending means are stirring in mechanical mixers or blenders, milling, grinding, and the like. If desired, these resins can also be applied to the rubber as a surface coating by using a solution of the resin in a suitable solvent such as petroleum ether, gasoline, dioxane and the like and allowing the solvent to evaporate.

Mixed tackifiers can be used in accordance with the present invention. Mixed tackifiers are prepared by reacting mixtures of various alkylphenols with formaldehyde, as described above. When mixed tackifiers are prepared of such mixed alkylphenols, there should be present no more than about 10 percent by weight based on the total phenol reactant and preferably no greater than about 5 percent by weight of alkyl phenols containing less than 9 carbon atoms in the alkyl group. Larger amounts adversely affect the degree of tack which the resin can impart. These lower molecular weight alkylphenols are sometimes added to increase the melting point of the novolak resin. However, when mixtures of isomeric alkylphenols are employed wherein all of the alkyl groups of all alkylphenols have from 9 to 15 carbon atoms, there is no such criticality and any ratio of such mixtures can be used.

Tackifier mixtures can also be used. These mixtures are prepared by physically mixing different alkylphenol-formaldehyde resins. When such tackifier mixtures are prepared, the lower alkylphenol-formaldehyde resins, i.e. wherein the phenolic alkyl group contains less than nine carbon atoms can be present in the tackifier mixture provided such lower alkylphenol-formaldehyde resins are used in an amount less than 10 percent by weight based on the total weight of the alkylphenol-aldehyde resin mixture and preferably less than about 5 percent by weight.

Heat reactive phenol-formaldehyde resins, i.e. resole type, should not be used, as their presence affects the properties of the vulcanized rubber by reducing tensile strength, and producing a stiffening effect.

It is contemplated that normal rubber additives can be present in the rubber stock of the present invention. Such additives include pigments, fillers, vulcanizers, accelerators, stabilizers, oxidation inhibitors and the like, as have been presently employed in the field of rubber technology.

One of the most commonly used and perhaps most useful additives to rubber stock is carbon black. This additive serves totally or in part as a filler, a vulcanization aid, a pigment, a stabilizer, and an antioxidant, and for these reasons has acquired widespread use in such products as vehicle tires, building materials and the like.

The test procedures employed herein are used to measure the relative tack of the elastomer compositions in the examples that follow:

HAND TEST

This test consists of pressing together two strips of the elastomer composition and then pulling them apart manually and judging the force required to separate them. All the sampes were tested 24 hours after the resin was incorporated into the rubber. A commercially available mixed tackifier of (octylphenol - butylphenol) - formaldehyde, non-heat reactive novolak resin was used as the control. In this control the phenol comprises a mixture of p-octylphenol and p-t-butylphenol, in a ratio of from about 9 to 1.

MACHINE TEST

This test was performed on a standard commercial tackmeter as described in British Patent 714,214 issued to Dunlop Rubber Co. Ltd.

To measure the tack of a material to itself using this method, a strip measuring 6 inches by ½ inch is cut and attached to the wheel of the instrument. The whole instrument is then lifted and placed on a sheet of the same material. The release mechanism is triggered allowing the surfaces to be pressed together under a determined load for a prescribed period of time. The return mechanism is then triggered causing the application of a steady increasing separating force to the laminate. The separating force is applied until the surfaces separate. The instrument is then moved, the sample is also moved to expose a fresh surface, ten such measurements are made using fresh surfaces.

In the examples which follow three different machine tests were made as follows:

*Test A.*—Surfaces were held in contact under the machine weight for a period of two seconds. The surface contact area was 0.25 inch diameter circle. Load required to separate in a 2 to 3 second steady pull force is measured in grams.

*Test B.*—This test is identical to test A above except that the contact time permitted was ten seconds.

*Test C.*—This test is identical to test A above except that the surface contact time permitted was twenty seconds and the measurement made is time to separate in seconds under a 1000 gram load.

*Ring and ball melting point.*—This data was obtained in accordance with the procedures defined in ASTM E-28–51T.

The examples which follow serve to illustrate this invention. Unless otherwise indicated, all parts and percentages are by weight.

A. Preparation of isomeric nonylphenol-formaldehyde novolak resin A

Nonylphenol - formaldehyde resin was prepared by charging to a three-necked one liter flask equipped with a thermometer and a mechanical stirrer, 220 grams (1 mole) of isomeric nonylphenol, and 2 percent by weight p-t-butylphenol; and 0.22 gram of 97 percent sulfuric acid. This mixture was then heated to a temperature of 90° C. and cooled to a temperature of 50° C.

To this heated mixture was then added 73 grams (0.9 mole) of formaldehyde as a 37 percent aqueous solution, and the reaction mixture was then heated to a temperature of 100° C. at which it was maintained for a period of one hour and four minutes. At the end of this reaction period the reaction chamber was evacuated to 28 inches of vacuum and the temperature of the reaction mixture was raised to 150° C. in order to remove the water from the reaction. The reaction mixture was maintained at this temperature until the formed resin had attained a ring and ball melting point of 211° F.

This resin was recovered directly and was evaluated as a tackifier in admixture with styrene-butadiene rubber, and butyl rubber as shown in the following tables.

B. Preparation of isomeric nonylphenol-formaldehyde novolak resin B

In a manner similar to that described in procedure A above a nonylphenol - formaldehyde novolac resin was prepared utilizing the following ingredients in the amounts listed below:

Isomeric p-nonylphenol _____ 220 grams (1 mole).
p-Tert-butylphenol _____ 3.1 grams (0.02 mole).
Formaldehyde (37%) in aqueous solution _____ 73 grams (0.9 mole).
Sulfuric acid catalyst _____ 0.22 gram.

The reaction procedure herein employed differed from that described in procedure A above only in that the water was removed under 28 inches of vacuum at a temperature of 130° C. instead of 150° C. and was maintained until a resin having a ring and ball melting point of 211° F. was secured. This tackifier resin was recovered directly and was evaluated as a synthetic rubber tackifier for an admixture with styrene-butadiene rubber, butyl rubber, and ethylene-propylene rubber as described and illustrated in the following tables below.

In a manner substantially identical with that described in the procedure above, seventeen different alkylphenol-formaldehyde resins were prepared. The ring and ball melting points are given for each resin below, as is the phenol-formaldehyde mole ratio. Each of the phenol-formaldehyde resins was recovered directly and evaluated as tackifiers in various synthetic rubbers as described and illustrated in the following tables. Of these resins evaluated, A and B above described and resins C through I in Table A constitute those of this invention. All others including the resole (heat reactive resins R and S are shown for purposes of comparison and control.

TABLE A

| Resins | Phenol Reacted | Phenol Formaldehyde Mole Ratio | Catalyst | Ring and Ball Melting Point,° F. |
|---|---|---|---|---|
| C | p-Nonylphenol | 1:1 | Sulfuric Acid | 192 |
| D | p-Dodecylphenol | 1:1 | do | 221 |
| E | p-Nonylphenol | 1:0.9 | do | Soft |
| F | do | 1:0.7 | do | Soft |
| G | p-Nonylphenol plus 5% p-tert-butylphenol. | 1:0.9 | do | 207 |
| H | p-Nonylphenol plus 5% p-tert-butylphenol. | 1:0.9 | Oxalic Acid | Soft |
| I | 50% p-nonylphenol plus 50% p-dodecylphenol. | 1:0.9 | Sulfuric Acid | 210 |
| J | p-Cresol | 1:1 | do | 274 |
| K | p-t-Butylpuenol | 1:1 | do | 300 |
| L | p-t-Amylphenol | 1:1 | do | 363 |
| M | p-Heptylphenol | 1:1 | do | 307 |
| N | p-Octylphenol | 1:1 | do | 313 |
| O | p-sec-Amylphenol | 1:1 | do | 170 |
| P | Dinonylphenol | 1:3 | do | Liquid |
| Q | Phenol | 1:1.2 | do | |
| R | p-tert-butylphenol | 1:3 | NaOH | (1) |
| S | p-Nonylphenol | 1:2 | NaOH | (1) |

[1] Resole-heat reactive.

EXAMPLE I

*Evaluation of phenol-formaldehyde resins as synthetic rubber tackifiers*

The phenol-formaldehyde resins prepared and described above were evaluated in various synthetic rubber systems using the hand test and the tackmeter test as described above. A commercially available mixed phenol-formaldehyde novolak of octyl-butyl phenol-formaldehyde was used as a control. In those evaluations where the hand test was used the degree of tack of this control was assigned the arbitrary value of 10. All other tack evaluations in the series are given values relative to the value of the control. The results of the machine test are given in the units specified.

*Evaluation procedure*

I. EVALUATION IN STYRENE-BUTADIENE RUBBER

A styrene-butadiene rubber composition was prepared having the following formulation:

Parts
Styrene-butadiene rubber (25% styrene, 75% butadiene) _____ 50
Natural rubber (smoked sheet) _____ 25
Reclaimed rubber (first quality whole tire of about 50% rubber and 50% carbon black) _____ 50
High abrasion furnace black _____ 25

The natural rubber was plasticated in a Banbury mixer, preheated to a temperature of 250° F., for a period of two minutes, and was then sheeted off through the rolls of a two roll mill. The Banbury blender was again preheated to a temperature of 250° F. and the plasticated natural rubber, the reclaimed rubber, and the styrene-butadiene rubber were charged to it. One minute later one half (12.5 parts) of the high abrasion furnace black was added and one minute later the other half was added. The mixture was blended for an additional minute and one-half and the blending was halted and the mixture was removed. This mixture is hereinafter referred to as masterbatch #1.

The Banbury mixer was preheated to a temperature of from about 70° C. to about 75° C. and 5 grams of the phenolic resin evaluated per 100 grams of masterbatch #1 were charged to it. The mixture was mixed for a period of from 4 to 5 minutes, sheeted off in one-eighth inch sheets on a two-roll mill, and cut into specimens for testing.

MACHINE TEST

|         |                                      | Styrene-Butadiene Rubber | |
|---------|--------------------------------------|------------------|---------------|
|         |                                      | Test B, grams    | Test C, sec.  |
| Control | Octyl plus butyl                     | 243              | 15            |
| B       | p-Nonyl plus 2% p-t-butyl            | 276              | 18            |
| I       | 50% p-nonylphenol, 50% dodecylphenol. | 295             | 18            |

EXAMPLE II

*Evaluation in butyl rubber*

A butyl rubber composition was prepared having the following composition:

Parts
Butyl rubber (97% isobutylene, 3% isoprene) ____ 100
Reclaimed butyl rubber _____ 25
High abrasion furnace black _____ 62.5

A Banbury mixer was preheated to a temperature of 180° C. and the butyl rubber was charged to it. The carbon black was divided into ⅓ portions and charged to the mixture by ⅓ portions per minute. The blender was allowed to continue an additional minute, and the mixture was sheeted off through the rolls of a two roll mill. This composition is hereinafter referred to as masterbatch #2.

A Banbury mixer was preheated to a temperature of from about 70 to 75° C. and 5 grams of the resin to be evaluated per 100 grams of masterbatch #2 were charged to it. The rolls of the blender were adjusted to give a thickness of about ⅛ inch and the mixture was bonded for a period of from about 4 to about 5 minutes after which it was sheeted off into one-eighth inch thick sheets and cut into specimens for testing.

TABLE B

| Example Resin Reference | Phenol Reacted | Butyl Rubber after— | | |
|---|---|---|---|---|
| | | 1 day | 3 days | 6 days |
| Control | Octyl plus butyl | 10 | 9 | 8 |
| A | p-c-Nonyl plus 2% p-t-butyl | 14 | 14 | 14 |
| B | p-Nonyl plus 2% p-t-butyl | 17 | 17 | 17 |
| C | p-Nonyl | 17 | 17 | 18 |
| D | p-Dodecyl | 17 | 17 | 17 |
| E | p-Nonyl | 17 | | |
| F | do | 16 | | |
| I | p-Nonly 50%, p-dodecyl 50% | 17 | 17 | 17 |
| K | p-t-Butyl | 10 | 8 | 8 |
| L | p-t-Amyl | 12 | 14 | 12 |
| P | Dinonyl | 9 | 15 | |
| R | p-t-Butyl (heat reactive) | 11 | | |
| S | p-t-Nonyl (heat reactive) | 10 | | |

MACHINE TEST

|         |                                      | Test A Butyl Rubber, grams |
|---------|--------------------------------------|----------------------------|
| Control | Octyl plus butyl                     | 264                        |
| B       | p-nonyl plus 2% p-t-butyl            | 304                        |
| I       | 50% p-nonylphenol, 50% p-dodecylphenol | 530                      |

EXAMPLE III

*Evaluation in ethylene-propylene rubber*

An ethylene-propylene rubber was prepared having the following composition:

Parts
Ethylene-propylene rubber (40% ethylene, 60% propylene, Mooney viscosity of 35–49 at 212° F. (8 minutes), sp. 0.86) _____ 100
High abrasion furnace black _____ 50

In a similar manner to that described for Evaluation II above masterbatch #3 was prepared.

A Banbury blender was preheated to a temperature of from about 80° to about 85° and 5 grams of the resin to be evaluated per 100 grams of the rubber were charged to it. The rolls were adjusted to give a thickness of ⅛ inch and the mixture was bonded for a period of from about 4 to about 5 minutes after which the mixture was sheeted-off into one-eighth inch thick sheets and cut into specimens for testing.

The results of the evaluations are given for each resin in the ethylene-propylene rubber in Table C below.

TABLE C

| Example Resin Reference | Phenol Reacted | Ethylene-Propylene Rubber after one day |
|---|---|---|
| Control | Octyl plus butyl | 10 |
| B | p-Nonyl plus 2% p-t-butyl | 12 |
| D | p-Dodecyl | 12 |

EXAMPLE IV

*Evaluation in ethylene-propylene-diene copolymer rubber*

An ethylene-propylene-diene copolymer rubber composition was prepared having the following formulation:

|  | Parts |
|---|---|
| Ethylene-propylene-diene copolymer rubber having a Mooney viscosity (ML-4 at 212° F.) of 140, a specific gravity of 0.865 and an iodine number of 10 (trade name: Royalene 200, manufactured by U.S. Rubber Co.) | 100 |
| High abrasion furnace carbon black | 60 |
| Stearic acid | 1 |
| Petroleum oil | 40 |
| Zinc oxide | 5 |
| 2-mercaptobenzylthiazone | 0.5 |
| Tetramethylthiuram monosulfide | 5 |
| Sulfur | 1.5 |

A Banbury mill was preheated to a temperature of about 150° C. and the rubber, zinc oxide, stearic acid, carbon black and petroleum oil were charged to it. This composition was blended for a period of four minutes in the same manner as was described in Example III. The temperature was then reduced to about 75° C. and the remaining ingredients were added and blended for an additional period of one minute.

One-hundred parts of the above rubber composition were charged to a Banbury heated to a temperature of 140° C. and 10 parts of the resin to be evaluated was added and blended therewith. This rubber composition was charged to a two roll mill adjusted to ⅛ of an inch and was sheeted off and cut into specimens for evaluation.

The results of the evaluations are given for each resin in the ethylene-propylene-diene copolymer rubber in Table D below.

TABLE D

| Example Resin Reference | Phenol Reacted | Tack After— | |
|---|---|---|---|
| | | 1 day | 5 days |
| None | | 10 | 10 |
| Control | Octyl and butyl | 12 | 10 |
| B | p-Nonyl plus 2% p-t-butyl | 15 | 14 |
| D | p-Dodecyl | 15 | 14 |
| I | 50% p-nonyl, 50% p-dodecyl | 15 | 14 |

EXAMPLE V

*Evaluation in ethylene-propylene-diene copolymer rubber*

An ethylene-propylene-diene rubber composition was prepared having the following formulation:

|  | Parts |
|---|---|
| Ethylene-propylene-diene rubber Mooney viscosity (ML 1+4 at 212° F.) of 85, and a specific gravity of 0.85 (trade name: Nordel E.C.D. 330, manufactured by Du Pont) | 100 |
| Zinc oxide | 5 |
| Stearic acid | 1 |
| High abrasion furnace black | 80 |
| Petroleum oil | 40 |
| Sulfur | 1.5 |
| 2-mercaptobenzylthiazone | 0.75 |
| Tetramethylthiuram monosulfide | 1.5 |

In a manner similar to that described in Example IV all but the last three ingredients were charged to a Banbury mill heated to a temperature of 94° C. After blending for a period of about four minutes the temperature was reduced to about 75° C. and the remaining three ingredients were added and blended into the composition.

Ten parts of the resin to be evaluated and one-hundred parts of the above rubber composition were charged to a two roll mill heated to a temperature of 70° C. The rolls of the mill were set to ⅛ inch and the rubber was sheeted off and cut into specimens for evaluation.

The results of the evaluations for each resin are listed in Table E below.

TABLE E

| Example Resin Reference | Phenol Reacted | Tack After— | |
|---|---|---|---|
| | | 1 day | 5 days |
| None | | 10 | 10 |
| Control | Octyl and butyl | 11 | 11 |
| B | p-Nonyl plus 2% | 16 | 16 |
| D | p-Dodecyl | 17 | 17 |
| I | 50% p-nonyl, 50% p-dodecyl | 16 | 16 |

EXAMPLE VI

*Evaluation in ethylene-propylene-diene copolymer rubber*

An ethylene-propylene-diene copolymer rubber composition was prepared having the following formulation:

|  | Parts |
|---|---|
| Ethylene-propylene-diene copolymer rubber having a Mooney viscosity (ML 1+4 at 212° F.) of 60 (trade name: Nordel E.C.D. 376, manufactured by Du Pont) | 100 |
| High abrasion furnace carbon black | 80 |
| Stearic acid | 1 |
| Petroleum oil | 40 |
| Zinc oxide | 5 |
| 2-mercaptobenzylthiazone | 0.75 |
| Tetramethylthiuram monosulfide | 1.5 |
| Sulfur | 1.5 |

In a similar manner to that described in Example V all but the last three ingredients were charged to a Banbury mill preheated to a temperature of 94° C. After blending for a total period of about four minutes the temperature was reduced to about 75° C. and the remaining three ingredients were added and blended into the composition.

Ten parts of the resin to be evaluated and one hundred parts of the above rubber composition were charged to a two roll mill, preheated to a temperature of 70° C. The rolls of the mill were set to ⅛ inch and the rubber was sheeted off and cut into specimens for evaluation.

The results of these evaluations for each resin are listed in Table F below.

TABLE F

| Example Resin Reference | Phenol Reacted | Tack After— | |
|---|---|---|---|
| | | 1 day | 10 days |
| None | | 10 | 10 |
| Control | Octyl plus Butyl | 12 | 10 |
| B | p-Nonyl plus 2% p-t-butyl | 15 | 14 |
| D | p-Dodecyl | 15 | 14 |
| I | 50% p-nonyl, 50% p-dodecyl | 15 | 14 |

EXAMPLE VII

Utilizing the same test procedure as described in Example I above the tackifying effect of isomeric p-nonylphenol-formaldehyde novolac resin was evaluated in styrene-butadiene rubber.

The rubber masterbatch was composed of:

Styrene-butadiene rubber 100 parts by weight
High abrasion furnace carbon black, 50 parts by weight.

The masterbatch was prepared as described in Example III by blending in a Banbury mixer at a preheat temperature of 240° F. The carbon black was added in ⅓ portions at one minute intervals for a period of 4 minutes. The phenolic resin tackifier was dispersed in the rubber stock by milling on a two roll mill for a period of 5 minutes.

The samples were evaluated by the hand test as described above after the bond had aged for a period of 8 days at room temperature. The following values were obtained:

No tackifier _____ 10
Isomeric p-nonylphenol _____ 20

Five parts by weight of the tackifiers were used in each of the above tests per 100 parts by weight synthetic rubber.

EXAMPLE VIII

*Effect of tackifiers on vulcanization*

A rubber stock composition having the following formulation was prepared:

| | Parts by weight |
|---|---|
| Styrene-butadiene rubber (25% styrene-75% butadiene) | 100 |
| High abrasion furnace carbon black | 50 |
| Stearic acid | 2 |
| Zinc oxide | 5 |
| Phenyl-B-naphthyl amine | 1.5 |
| Sulfur | 2 |
| Benzyl thiazyl disulfide | 1.5 |
| Selenium diethyldithiocarbamate | 0.1 |

The above ingredients were mixed in a Banbury mixer in a similar manner to that described for Example I. This rubber stock was divided into two parts and to each part was added 5 parts of tackifier resin as described below to portion 1 was added isomeric p-octylphenol-formaldehyde novolak resin, and to portion 2 was added isomeric p-nonylphenol-formaldehyde novolac resin. The tackifier resins were blended into the rubber stock by blending on a Banbury mixer for two minutes and the blend was then sheeted off on a two roll mill. Equal size samples were then cut and vulcanized at a temperature of 287° F. for a period of ten minutes. The samples were then evaluated giving the results shown below.

300 PERCENT MODULUS (ASTM METHOD D–412–61T)

Pounds per square inch
Portion 1 (octyl) _____ 651
Portion 2 (nonyl) _____ 1209

TENSILE STRENGTH (ASTM METHOD D–412–61T)

Portion 1 (octyl) _____ 1575
Portion 2 (nonyl) _____ 2343

PERCENT ELONGATION (ASTM METHOD D–412–61T)

Portion 1 (octyl) _____ 555
Portion 2 (nonyl) _____ 500

From the above data it is concluded that the samples of portion 2 (nonyl) attained a more thorough cure than did the samples of portion 1 (octyl). Since the only variable present was the tackifier used, it becomes self evident that the isomeric p-octylphenol-formaldehyde novolak tackifier resin inhibits vulcanization to a greater degree than does the isomeric p-nonylphenyl-formaldehyde novolac tackifier resin.

EXAMPLE IX

*Effect of tackifiers on vulcanization*

Example V above was repeated except that the rubber stock formulation contained only 1 part by weight benzylthiazyldisulfide instead of 1.5 parts by weight and in addition contained 8 parts by weight of a process oil made by the Humble Oil Company and known as Flexon 845. The samples were cured at a temperature of 287° F. for a period of twenty minutes and evaluated. The results of the evaluation were as follows:

300 PERCENT MODULUS (ASTM METHOD D–412–61T)

Pounds per square in.
Portion 1 (octyl) _____ 1146
Portion 2 (nonyl) _____ 1685

TENSILE STRENGTH (ASTM METHOD D–412–61T)

Portion 1 (octyl) _____ 2100
Portion 2 (nonyl) _____ 1900

PERCENT ELONGATION (ASTM METHOD D–412–61T)

Portion 1 (octyl) _____ 420
Portion 2 (nonyl) _____ 385

EXAMPLE X

*Effect of tackifiers on vulcanization*

In a manner similar to that described in Example IV, the effect of tackifiers on vulcanization was determined for butyl rubber. A rubber stock was prepared as described in Example IV above which had the following formulation:

| | Parts by weight |
|---|---|
| Butyl rubber, 97 percent isobutylene and 3 percent isoprene | 100 |
| High abrasion furnace carbon black | 50 |
| N-methyl-N, 4 dinitroaniline | .25 |
| White clay | .50 |
| Stearic acid | 1 |
| Zinc oxide | 5 |
| Sulfur | 1.5 |
| Benzylthiazyldisulfide | 1 |
| Selenium diethyldithiocarbamate | 0.1 |

Five parts by weight of isomeric p-octylphenol-formaldehyde novolak resin was added to one portion of the above rubber stock and five parts by weight of isomeric p-nonylphenol-formaldehyde novolac resin was added to the other portion of rubber stock. Blending was accomplished in a Banbury mixer in two minutes. The portions were sheeted off a two roll mill and cut into samples of equal size. These samples were evaluated and gave the following results:

300 PERCENT MODULUS (ASTM METHOD D–412–61T)

Portion 1 (octyl) _____ 1050
Portion 2 (nonyl) _____ 1301

TENSILE STRENGTH (ASTM METHOD D–412–61T)

Portion 1 (octyl) _____ 2181
Portion 2 (nonyl) _____ 2185

PERCENT ELONGATION (ASTM METHOD D–412–61T)

Portion 1 (octyl) _____ 570
Portion 2 (nonyl) _____ 470

These results show conclusively that the isomeric p-nonylphenol-formaldehyde novolac resin permit a greater state of cure to rubber stock compositions or conversely inhibit the vulcanization of the rubber to a lesser degree than the prior art rubber tackifiers (octyl).

What is claimed is:

1. A composition comprising a rubber selected from the group consisting of:

polybutadiene
butadiene-styrene copolymers
polyisoprene
polychloroprene
ethylene-propylene-diene terpolymers
natural rubber, and
isobutylene-isoprene copolymers and as a tackifier therefor from about two to about twenty parts by weight per hundred parts rubber of a fusible non-heat hardenable novolak resin of formaldehyde and a phenol having the formula:

wherein R is an alkyl group containing from about 9 to about 15 carbon atoms inclusive and said phenol is composed predominantly of branched chain para substituted alkyl groups.

2. A synthetic rubber stock consisting essentially of a synthetic rubber from the group consisting of:

polybutadiene
butadiene-styrene copolymers
polyisoprene
polychloroprene
ethylene-propylene-diene terpolymers
natural rubber and
isobutylene-isoprene copolymers and a phenol-formaldehyde novolak resin which is a condensate of isomeric p-nonylphenol and formaldehyde.

3. The composition of claim 2 wherein the synthetic rubber is isobutylene-isoprene copolymer.

4. The composition of claim 2 wherein the synthetic rubber is styrene-butadiene rubber.

5. The composition of claim 2 wherein the synthetic rubber is an ethylene-propylene-diene terpolymer rubber.

6. The composition of claim 1 wherein the said novolak resin is a condensate of p-dodecylphenol and formaldehyde.

7. The composition of claim 6 wherein the synthetic rubber is isobutylene-isoprene copolymer.

8. The composition of claim 6 wherein said synthetic rubber is styrene-butadiene rubber.

9. The composition of claim 6 wherein said synthetic rubber is an ethylene-propylene-diene terpolymer rubber.

10. The method of imparting building tack to rubber stock selected from the group consisting of:

polybutadiene
butadiene-styrene copolymers
polyisoprene
polychloroprene
ethylene-propylene-diene terpolymers
natural rubber, and
isobutylene-isoprene copolymers by thoroughly admixing with said rubber from about 2 to about 100 parts per hundred parts rubber of a phenol formaldehyde novolak resin which is a condensate of formaldehyde and a phenol having the formula:

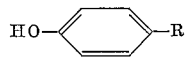

wherein R is an alkyl group containing from about 9 to about 15 carbon atoms inclusive and wherein said alkyl substituted phenol is composed predominantly of branched chain p-alkyl substituted alkyl groups.

11. The method of claim 10 wherein said phenol is an isomeric mixture of p-nonylphenol wherein said isomeric p-nonylphenol is composed predominantly of branched chain p-nonyl groups.

12. The method of claim 10 wherein said phenol is an isomeric mixture of p-dodecylphenol wherein said p-dodecylphenol is composed primarily of branched chain p-dodecyl substituted groups.

13. The method of claim 10 wherein the rubber stock is an ethylene-propylene-diene terpolymer rubber.

References Cited by the Examiner
UNITED STATES PATENTS

| | | | |
|---|---|---|---|
| 2,657,185 | 10/1953 | Young et al. | 260—845 |
| 2,987,420 | 6/1961 | Bemmels et al. | 260—845 |
| 3,127,369 | 3/1964 | Warren | 260—848 |

MURRAY TILLMAN, *Primary Examiner.*

J. C. BLEUTGE, *Assistant Examiner.*